(12) United States Patent
Muehlhans et al.

(10) Patent No.: US 12,327,988 B2
(45) Date of Patent: Jun. 10, 2025

(54) CABLE LAYING SYSTEM FOR AUTOMATED LAYING OF CABLES IN A BUILDING WITH A CABLE LAYING DEVICE AND CABLE LAYING DEVICE

(71) Applicant: GOODVILLE GMBH, Hamburg (DE)

(72) Inventors: Christoph Muehlhans, Hamburg (DE); Friederike Muehlhans, Hamburg (DE)

(73) Assignee: Goodville GMBH, Hamburg (DE)

( * ) Notice: Subject to any disclaimer, the term of this patent is extended or adjusted under 35 U.S.C. 154(b) by 282 days.

(21) Appl. No.: 18/076,472

(22) Filed: Dec. 7, 2022

(65) Prior Publication Data
US 2023/0187914 A1    Jun. 15, 2023

(30) Foreign Application Priority Data
Dec. 13, 2021  (DE) .................... 10 2021 132 837.3

(51) Int. Cl.
*H02G 1/08*    (2006.01)

(52) U.S. Cl.
CPC .................................... *H02G 1/08* (2013.01)

(58) Field of Classification Search
CPC . H02G 1/08; H02G 1/02; H02G 1/083; E21B 19/084; B60L 15/20; B62D 55/26; B62D 61/12
See application file for complete search history.

(56) References Cited

U.S. PATENT DOCUMENTS

| | | | | |
|---|---|---|---|---|
| 3,036,435 A | * | 5/1962 | Samuely | B66D 1/08 187/244 |
| 6,193,218 B1 | * | 2/2001 | Philyaw | H02G 1/08 254/326 |
| 6,347,761 B1 | * | 2/2002 | Larson | B65H 54/74 242/397.3 |
| 8,336,857 B2 | * | 12/2012 | Davis | E03F 9/00 254/134.3 R |

(Continued)

FOREIGN PATENT DOCUMENTS

| | | |
|---|---|---|
| CN | 112332306 | 2/2021 |
| CN | 212676780 U | 3/2021 |

(Continued)

OTHER PUBLICATIONS

European Search Report dated May 12, 2023 from corresponding European Application No. 22213009.8.

*Primary Examiner* — Lee D Wilson
(74) *Attorney, Agent, or Firm* — Grogan, Tuccillo & Vanderleeden, LLP (57) ABSTRACT

In order to provide a cable laying system for the automated laying of cables in a building, with which cables for an electrical installation can be laid efficiently and with little expenditure of time, and which ensures that the laid cables can be reliably located for subsequent maintenance and renovation projects, a cable laying system for the automated laying of cables in a building is proposed, comprising a cable laying device, in particular a cable installation robot, with a mobile base and a laying unit arranged on the base (Continued)

and configured for laying a cable, wherein it is provided that the cable laying device comprises a position determination unit for determining the position of laid cable sections, wherein the cable laying system is configured to store the position of laid cable sections in a storage device.

15 Claims, 5 Drawing Sheets

(56) References Cited

U.S. PATENT DOCUMENTS

| | | | |
|---|---|---|---|
| 8,918,230 B2* | 12/2014 | Chen | G05D 1/0016 |
| | | | 701/2 |
| 11,137,764 B2* | 10/2021 | Appel | B08B 9/049 |
| 2005/0062030 A1* | 3/2005 | Wentworth | E21B 19/084 |
| | | | 254/323 |
| 2014/0031977 A1* | 1/2014 | Goldenberg | B62D 55/26 |
| | | | 180/9.1 |
| 2015/0329335 A1* | 11/2015 | Azzarelli | B66D 3/006 |
| | | | 254/323 |
| 2020/0358277 A1 | 11/2020 | Kewitsch | |
| 2023/0187914 A1* | 6/2023 | Muehlhans | H02G 1/08 |
| | | | 254/134.3 R |

FOREIGN PATENT DOCUMENTS

| | | |
|---|---|---|
| DE | 102019125738 A1 | 3/2021 |
| GB | 2468113 A | 9/2010 |
| JP | 2019140712 | 8/2019 |

* cited by examiner

CABLE LAYING SYSTEM FOR AUTOMATED LAYING OF CABLES IN A BUILDING WITH A CABLE LAYING DEVICE AND CABLE LAYING DEVICE

CROSS-REFERENCE TO RELATED APPLICATION

This application claims priority to DE Patent Application No. 10 2021 132 837.3 filed Dec. 13, 2021, which is hereby incorporated by reference in its entirety.

TECHNICAL FIELD

The present invention relates to a cable laying system for automated laying of cables in a building, comprising a cable laying device, in particular a cable installation robot, with a mobile base and a laying unit arranged on the base and configured for laying a cable. Furthermore, the present invention relates to a cable laying device and a cable for such a cable laying system.

TECHNOLOGICAL BACKGROUND

During the construction or renovation of buildings, such as commercial or residential properties, in particular residential buildings or apartments, it is necessary to provide for an electrical installation adapted to the needs, within the framework of which cables, especially electric lines, power outlets as well as light switches and, more recently, intelligent electrical devices, in particular those connected to the Internet, for the so-called SmartHome are installed. Such installation work is time-consuming and cost-intensive. In addition, with the growing number of devices to be installed and thus the growing number of cables to be laid, the need for documentation is constantly increasing. Thus, it is necessary that even after many years it can be determined without any problems where cables are laid in a wall or masonry of a building, what purpose they serve and to which devices they are connected.

US 2020/0358277 A1 discloses a device and a method for laying fiber optic cables in a data center using one or more cable laying robots. In the device and the method, a route calculation algorithm is used. The position of the cables is calculated and optimized. The ends of the cables may be tagged with a barcode or RFID identifier. The state of all cables as well as their start and end positions are stored in a database.

CN 212676780 U discloses a cable laying robot with navigation and automatic obstacle avoidance. The robot comprises a LIDAR system and a gyroscope, which enable intelligent navigation and allow the cable laying robot to autonomously travel to a predetermined location.

A tube bundle and a tube system are known from EP 3 836 325 A1. The tube bundle comprises a number of tubes of a polymeric material arranged in a sleeve of polymeric material, wherein at least one tube on or in its outer surface has a tube marking which is formed repetitively spaced apart from each other.

EP 2 226 902 A1 describes a cable on which a marking is applied. One part of the marking identifies the cable and is repeated in the length direction of the cable. A second part of the marking changes along the cable. A part of the marking can be formed as a barcode or QR code.

BRIEF DESCRIPTION

It is the object of the present invention to provide a cable laying system for the automated laying of cables in a building, with which cables for an electrical installation can be laid efficiently and with little expenditure of time, and which ensures that the laid cables can be reliably located for subsequent maintenance and renovation projects.

To solve the object underlying the invention, a cable laying system for automated laying of cables in a building is proposed, comprising a cable laying device, in particular a cable installation robot, with a mobile base and a laying unit arranged on the base and configured for laying a cable, wherein it is further provided that the cable laying device comprises a position determination unit for determining the position of laid cable sections, and wherein the cable laying system is configured to store the position of laid cable sections in a storage device.

The cable laying system comprises a cable laying device which is designed to lay cables, in particular electric cables or electric lines, in a building or in a wall or masonry of a building. For this purpose, the cable laying device has a mobile base and a laying unit. The mobile base is used to move the cable laying device in the building and in particular along the walls of the building. By means of the laying unit, the cable laying device is enabled to lay the cables in the room.

According to the invention it is provided that the cable laying device has a position determination unit. The position determination unit serves to determine the position of the laid cable sections, i.e. in particular the position, orientation and height of the laid cable sections in or on the wall or masonry. According to the invention, the cable laying system is further configured to store the position of laid cable sections in a storage device. It is thus possible to determine and store the actual position of the laid cables already during the laying process, so that an exact plan of the installed cables and, if necessary, the actual position of junction boxes can be generated. For later maintenance or renovation work, even flush-mounted cables can then be easily located and assigned to the junction boxes, light switches or other electrical devices connected to the cables, such as Smart-Home devices.

The exact plan of the actual positions of the laid cables or cable sections, which can be determined from the data of the storage device after the laying of the cables, can serve as a basis for further installation works of other trades as well.

Preferably, the positions of laid cable sections can be assigned to further information and stored together with them. Furthermore, the digital plan of the electrical installation obtained from the stored data can be completed with the continuing construction progress.

The positions of laid cable sections are thereby preferably stored in a database of the storage device.

With further advantage, it is provided that the cable laying system is configured to generate an installation plan of the laid cable sections.

In particular, the cable laying system is thus configured not only to store the position of laid cable sections, but also to insert the positions of the laid cable sections into a, preferably digital, floor plan of a building or a room of the building.

Preferably, it is further provided that the cable laying system comprises a cable to be laid, wherein the cable to be laid has a marking, preferably a machine-readable code, at regular intervals, and/or wherein the cable laying device has a marking device, wherein the marking device is configured, preferably when laying the cable, to provide the cable with a marking, preferably a machine-readable code, at regular intervals.

The marking may in particular be a machine-readable code such as a bar code, a UPC code, a QR code or micro QR code, or a colored code. In addition, the marking may also be in the form of notches in an insulation material of the cable or in the form of stickers on the cable. The marking can be introduced into the insulation material of the cable to be laid by printing, by embossing or by milling.

Due to the marking provided at regular intervals, each cable section can be detected with its data, such as position, length, location, height, alignment, its connection to other cable sections, the IP addresses of electrical devices connected to the cable sections, such as SmartHome devices, the manufacturer's data or the laying date, and can be stored in the storage device. This enables uninterrupted and complete documentation of the laid cables or the electrical installation. In particular, compared to methods known from the prior art, not only the cable ends are provided with a marking, but each cable, in particular each cable section, also has markings at regular intervals between the cable ends, on the basis of which, together with further information, the course of each cable in the masonry or in the wall can be traced.

In this context, the cable laying device can have a material stock, in particular a cable reel, on which the cable marked or to be marked is arranged and stocked.

If a marking device is provided, it is configured in particular to apply the marking directly before or during laying of the cable. This means that the applied marking can be stored in the storage device at the same time as the detected position of the cable or cable section.

Preferably, therefore, it is provided that each cable section has a marking, and/or that the marking device is configured to provide each cable section with a marking.

The cable sections can have a predetermined length of, for example, one meter or less. This makes it possible to identify each cable section by its marking and to locate its position in a wall or masonry of a building by means of the positions of the laid cable sections stored in the storage device.

Particularly preferably, it is provided that the marking is an infinite and/or continuous marking, wherein the marking changes at intervals along the cable of less than 5 cm, preferably of less than 3 cm, particularly preferably of less than 1 cm, so that each cable section with a length of less than 5 cm, preferably of less than 3 cm, particularly preferably of less than 1 cm, is individually marked.

The marking thus changes on very short length scales of less than 5 cm, for example, so that each correspondingly short cable section can be clearly identified and localized.

It is particularly preferred that the marking is an infinite and/or continuous machine-readable code. This can, for example, be formed from single-color lines in the form of a barcode, which has lines of different widths or spaces of different widths along the cable. The marking changes quasi every centimeter and thus uniquely identifies the respective cable section.

With further advantage, it is provided that the cable has a shielding, and/or that the cable has an insulation, wherein the insulation of the cable consists entirely or partly of a transparent material, wherein the transparent material is configured to conduct coupled light.

The transparent material can for example be configured in the form of a light conductor embedded in the insulation. The transparent material makes it possible to couple light into one end of a laid cable and, on the basis of the light emerging from the other end of the cable, to identify it unambiguously and to assign the corresponding cable ends to one another.

Preferably, it is further provided that the cable laying system is configured to store the position of laid cable sections together with the marking arranged on the cable section in the storage device.

Particularly preferably, it can be provided that the cable laying system is configured to store the position of laid cable sections together with further information, in particular with the length and/or the position and/or the orientation of the laid cable sections, and/or with the markings of further cable sections connected to the respective cable section, and/or with the IP addresses of modules connected or to be connected to the laid cable sections, and/or a date, in the storage device.

Here, it can be provided that this data is stored in BIM format (Building Information Modeling). By storing this information, preferably together with the marking of the respective cable section, as well as the position of the cable section in the storage device, each visible or exposed cable section can be identified later.

In modern buildings, intelligent modules, in particular intelligent electrical devices, so-called SmartHome devices, are increasingly being used. Such intelligent modules or devices can exchange data with each other and/or with the Internet by means of the cables laid by the cable laying system. For this purpose, each of the modules is assigned an IP address. If the IP addresses of the modules connected or to be connected to the laid cable section are thus also stored, then in the event of a fault for each module the data in the storage device can be used to identify the respective cable section connected to the module and to locate it in the wall or masonry with regard to its position. This enables quick maintenance or repair of faults in the electrical installation.

The modules may also include junction boxes, power outlets or sockets, switches, sensors, lights, door or window contact, control panels, WLAN transmitters, LiFi transmitters or cable connections.

Furthermore, it may be provided that the cable laying device has a marking sensor for detecting and/or reading the marking of the cable.

This is particularly advantageous if the cable or the cable to be laid already has a marking ex works and the marking is not only applied to the cable to be laid by means of a marking device of the cable laying device. Depending on the type of marking, the marking sensor is configured accordingly. If the marking is a bar code or UPC code, a bar code or UPC code reader is provided accordingly. In the case of a colored code, the marking sensor is designed to detect the colored code. This can be done using a camera device, for example.

With further advantage, it is provided that the cable laying device comprises a milling unit, wherein the milling unit is configured to manufacture a cable duct in a wall or masonry of the building, wherein the laying unit is configured to lay a cable section to be laid in a cable duct produced by the milling unit.

The milling unit is configured in particular for manufacturing holes or slots in the wall or masonry. Therefore, the milling unit may comprise a pot drill and/or a slot drill and/or a cutting disc and/or further suitable tools or combinations of these tools. Furthermore, it may be provided that the respective tools of the milling unit, such as pot drill, slot drill or cutting disc, are interchangeable.

Preferably, it is further provided that the cable laying device has a telescopic arm, wherein the laying unit and/or the milling unit is and/or are attached to the telescopic arm.

Instead of a telescopic arm, a folding arm can also be provided, or the telescopic arm can additionally be configured as a folding arm. It is also possible that several telescopic arms or folding arms are provided, wherein the laying unit is arranged on a first telescopic arm and the milling unit is arranged on a second telescopic arm. By means of the telescopic arm(s) and/or folding arm(s), the milling unit and/or the laying unit can be moved in a vertical and/or horizontal direction, thus creating the possibility of laying cables at any location in the wall.

Furthermore, it is also possible that by means of the telescopic or folding arm a laying of cables or cable sections in a ceiling or in a floor of a room or a building can be carried out. The milling unit and/or the laying unit can lay the cables vertically or horizontally. Furthermore, it can be provided that the milling and/or the laying unit are configured to lay the cables or cable sections in curves according to a minimum bending radius of the cables.

The milling and/or laying unit can be configured to work overhead so that it is possible to lay cables in the ceiling.

Furthermore, it may be provided that the cable laying device has a dust extraction device.

The dust extraction device is arranged in particular in, on or near the milling unit in order to directly extract the dust produced during milling or slotting or drilling of the wall. The dust extraction device may have a collecting container. The dust extraction device can be configured as a movable suction cup, which is arranged around the entire milling unit and/or laying unit.

It may further be provided that the cable laying device comprises a filler unit and/or a drying stage for drying a filler material.

Thus, in one embodiment, it is possible for the cable laying device to be configured not only to lay a cable in a cable duct, but also to subsequently fill the cable duct and, if necessary, to smooth the wall. To enable further processing of the wall as quickly as possible, a drying stage can also be provided for drying the filler material.

The filler unit and/or the drying stage may also be attached to the telescopic or folding arm, or a separate telescopic or folding arm may be provided for the filler unit and/or the drying stage.

With further advantage, it is provided that the cable laying device comprises a sensor arrangement, wherein the sensor arrangement is configured to generate a floor plan and/or a 3D model of a room of the building.

By means of the sensor arrangement, the cable laying device can detect its exact location in the room or in the building. Furthermore, the cable laying device can scan the room for the building condition and detect possible damage or obstacles in the working path.

Based on the floor plan generated by means of the sensor arrangement, the laying of the cables is carried out using actual floor plan data. Thus, it is not exclusively relied on a previously existing construction planning. Furthermore, the position of the laid cables or cable sections can be inserted into a digital construction plan, which corresponds to the actual floor plan of the room. The cable laying system, in particular a computing device of the cable laying system or the cable laying device, can be configured to compare the measured floor plan with the construction plan, to transfer an installation planning from the construction plan to the measured floor plan or a 3D model of the room, or to calculate the correct position of necessary modules and/or electrical devices for an installation plan or laying plan on site and before starting work.

The sensor device may comprise a laser scanner and/or a LIDAR scanner and/or a direction finder transmitter and/or a direction finder receiver and/or a GPS receiver and/or a compass.

By means of the direction finder transmitter or the direction finder receiver, reference points in the room can be measured, for example. The GPS receiver and compass also make it possible to determine the geographical position and compass direction or orientation of the cable laying device. Due to the precise measurement of the floor plan, in particular the walls, ceiling and floor of the room, any unevenness or obstacles not present in the construction plan, such as cables already laid on the shell wall, pipes or plaster rails attached to the wall, can be detected and taken into account accordingly when laying the cables.

The sensor arrangement also enables the cable laying device to orient itself in the room, to perform navigation in the room and to avoid any obstacles that may be present.

With further advantage, it can be provided that the position determination unit comprises position sensors and/or positioning sensors, in particular for the telescopic arm, and/or the sensor arrangement.

The position determination device can thus also comprise the sensor arrangement, or make use of its sensor signals. By means of the position sensors, the orientation and the horizontal position of the cable laying device can be determined. The positioning sensors can be used to determine the positioning or position of the telescopic or folding arm, and thus also of the laying unit or milling unit arranged therein, in three-dimensional space. Using the position sensors and/or the positioning sensors and/or the sensor arrangement, the positions of the laid cables in or on the wall can be precisely determined.

With further advantage, it is provided that the cable laying device has a sensor for determining a material condition of walls or of a masonry of the building.

This allows the cable laying device to select or adjust the tools, such as the milling unit, accordingly to take into account the material condition of the walls or masonry. In particular, damage or obstacles given by the material condition of the wall can be identified.

In a preferred embodiment, it is provided that the cable laying device is configured to interconnect laid cable sections and/or modules, in particular electrical devices, preferably junction boxes, sockets, switches, sensors.

By means of the cable laying device of the cable laying system, further steps can thus be taken for the manufacturing of the electrical installation in a room or a building. For example, the cables laid by the laying unit of the cable laying device can be independently connected by the cable laying device to electrical devices or modules, junction boxes, sockets, switches or sensors, which means that these activities no longer have to be carried out manually.

Furthermore, the cable laying device can be configured to cut laid cables or cable sections at the correct point, and/or to connect them with a clamp and/or to fix the clamp in a flush-mounted box. Furthermore, it can be provided that the cable laying device is configured to release a laid cable or a laid cable section for the conduction of current. The cable laying device can also be configured to read out a clamp and/or to determine an IP address of a module that has been laid or is to be laid and/or to store location and connection data in a storage of a module.

The cable laying device can also be configured to connect inserted clamps to the modules, in particular, intelligent SmartHome devices, junction boxes, power outlets or sockets, switches, sensors, lights, door or window contacts, control panels, WLAN transmitters, LiFi transmitters or cable connections.

With further advantage, it is provided that the cable laying system comprises a computing device, wherein the computing device is configured, preferably depending on specifications, to generate a laying plan, wherein the laying plan comprises the position or location of the cables or cable sections to be laid, and/or of electrical devices or modules, junction boxes, sockets, switches, sensors.

The cable laying system is thus able to generate a laying plan for the cables to be laid, if necessary on the basis of external specifications. Thus, if no specifications are given by the construction plan, the cable laying system can independently calculate the optimum position of modules, switches, sockets and sensors or junction boxes etc. and carry out the work accordingly. The external specifications may be detailed, specifying the number and position of electrical devices or modules, junction boxes, sockets, switches, sensors, so that the cable laying system then essentially only determines the laying plan for the cables to be laid. However, it is also possible for the external specifications to specify only the number of electrical devices or modules, junction boxes, sockets, switches, sensors, so that the cable laying system also determines the optimal positions for these elements. Furthermore, the external specifications can also include the position of already laid lines for water, gas or elements determining the statics.

With further advantage, it is provided that the computing device carries out an artificial intelligence process.

In particular, the artificial intelligence process is used to generate the laying plan based on the detected data, such as floor plans or 3D models generated by the cable laying device, the external specifications or the wall condition.

Preferably, it is further provided that the cable laying device has means for surface laying of cables or cable sections to be laid.

Thus, the cable laying device can have devices for gluing, hot-gluing or tacking cables to a shell wall, for surface mounting or for later plastering in the cables.

Furthermore, it is preferably provided that the mobile base of the cable laying device has wheels, wherein the wheels are pivotable about a vertical axis, preferably about 180°, further preferably about 360°.

Three, four or more wheels may be provided.

The cable laying device can travel along the walls of, for example, a rectangular room from wall corner to wall corner by means of the wheels. When the cable laying device reaches a corner of the room, all four wheels turn 90° and the cable laying device continues to travel at a right angle in order to move the cable laying device along the next wall and lay cables there.

It may further be provided that the cable laying system has a central data processing device, in particular a server.

In this context, the central data processing device may comprise the computing device of the cable laying system or perform tasks complementary to the computing device of the cable laying device. In particular, it is possible for the central data processing device to comprise the storage device in order to store the positions of the laid cables or cable sections determined by the position determination unit.

Furthermore, it may be provided that the central data processing device sends the construction plan and/or external specifications or installation tasks to the cable laying device. It may further be provided that the cable laying device is in a constant contact with the central data processing device during the process of the cable laying. Thus, during the use of the cable laying device, the positions of the cables and cable sections stored in the storage device of the central data processing device and the construction progress can be continuously updated.

The central data processing device can also be a permanently installed data processing device assigned to the building or room. For example, the central data processing device may run the server for SmartHome devices. In other words, the building and/or the room is then equipped with the central data processing device, which is provided for both the control of the SmartHome devices, the monitoring of the electrical installation and the creation of the actual installation plan of the laid cables.

It is further preferred that the central data processing device is configured to apply a high frequency AC voltage to the shielding and/or a core of a laid cable, and/or that the central data processing device is configured to couple light into the transparent material of the insulation of the cable.

In particular, if the laid cables or cable sections are to be identified and located later, for example during a renovation task, it is advantageous if the laid cables can be controlled or addressed by means of the central data processing device in order to locate them. For example, the data processing device can be configured to apply a high-frequency AC voltage to the shielding and/or a core of a laid cable. This causes the shielding or the core of the cable to act like a radio antenna. The electromagnetic radiation generated by the shielding or the core can be received and located, for example, by a portable data processing device such as a cell phone. This makes it possible to locate the laid cables.

If the central data processing device is also adapted to couple light into a transparent material of an insulation of a cable, the light emerging at the other end of the cable can be used to identify a cable. For this purpose, a light source, for example an LED light source, is preferably present at at least one end of each laid cable. This can be switched on and off via the central data processing device.

With further advantage, a software application for a portable data processing device can be provided, wherein by means of the software application carried out on the portable data processing device, the positions of laid cable sections can be displayed, preferably with an augmented reality process.

The portable data processing device can be configured as a cell phone, in particular a smartphone. By means of the software application, the positions and other information assigned to the cables or cable sections can be read out from the storage device of the cable laying system. Using the sensors of the portable data processing device, such as position sensors or the camera, the laid cables can be displayed on a screen of the portable data processing device as part of an augmented reality process. The laid cables then appear in their original size with all details quasi floating in front of the wall.

If modules, such as intelligent electrical devices, in particular SmartHome devices, or junction boxes, power outlets or sockets, switches, sensors, lights, door or window contacts, control panels, WLAN transmitters, LiFi transmitters or cable connections, which are preferably provided with an IP address, are provided, it can also be provided that by means of the portable data processing device the IP address or other suitable marking is read out, and that by means of the software application the positions of the cables or cable sections assigned to the module are then read out from the storage device. Subsequently, the laid cables can be displayed on the screen of the portable data processing device as part of an augmented reality process.

A further solution to the object underlying the invention consists in a cable for a cable laying system as described above, wherein the cable has a marking, preferably a machine-readable code, at regular intervals.

All of the functions, properties and features described above in connection with the cable for the cable laying system can also be applied in a corresponding manner to the cable according to the invention.

Thus, it may preferably be provided that the marking is an infinite and/or continuous marking, wherein the marking changes at intervals along the cable of less than 5 cm, preferably less than 3 cm, particularly preferably less than 1 cm, so that each cable section with a length of less than 5 cm, preferably less than 3 cm, particularly preferably less than 1 cm, is individually marked.

It may be further preferred that the cable has a shielding, and/or that the cable has an insulation, wherein the insulation of the cable consists entirely or partially of a transparent material, wherein the transparent material is configured to conduct coupled light.

A still further solution to the object underlying the invention is to provide a cable laying device, in particular a cable installation robot, for a cable laying system described above.

All functions, features and embodiments explained in connection with the cable laying device of the cable laying system described above can be transferred in a corresponding manner to the cable laying device according to the invention.

The cable laying device preferably comprises a base plate rotatably mounted on the mobile base and/or a housing rotatably mounted on the mobile base.

On the base plate or in or on the housing is the motorized drive of the chassis and/or the movable telescopic or folding arms.

The base plate or housing may further have a power supply in the form of a battery or cable connection.

In addition, the base plate or housing may have a material stock, such as a cable reel, and/or a reservoir for filler, and/or flush-mounting boxes, and/or cable connector modules, and/or connection modules, and/or clamps.

Furthermore, the base plate and/or the housing has a marking device for individually marking the cables according to the installation position and use.

The marking device can alternatively be arranged on a telescopic or folding arm.

The housing further comprises a computing unit for evaluating data from a sensor arrangement, for control, for communication with the central data processing device or with the storage device. The computing unit may further have a WLAN antenna.

The computing device may further be configured to carry out artificial intelligence processes.

Furthermore, it may be provided that the base plate or the housing has an operation unit for switching on the cable laying device, such as a touch display or the like.

The cable laying device may also have warning lights and visual indicators to mark or cordon off the work area during operation.

DRAWINGS

The invention is explained in more detail below with reference to the accompanying figures. The figures show.

DETAILED DESCRIPTION

In the figures, identical or corresponding elements are marked with the same reference signs.

Figure 1:
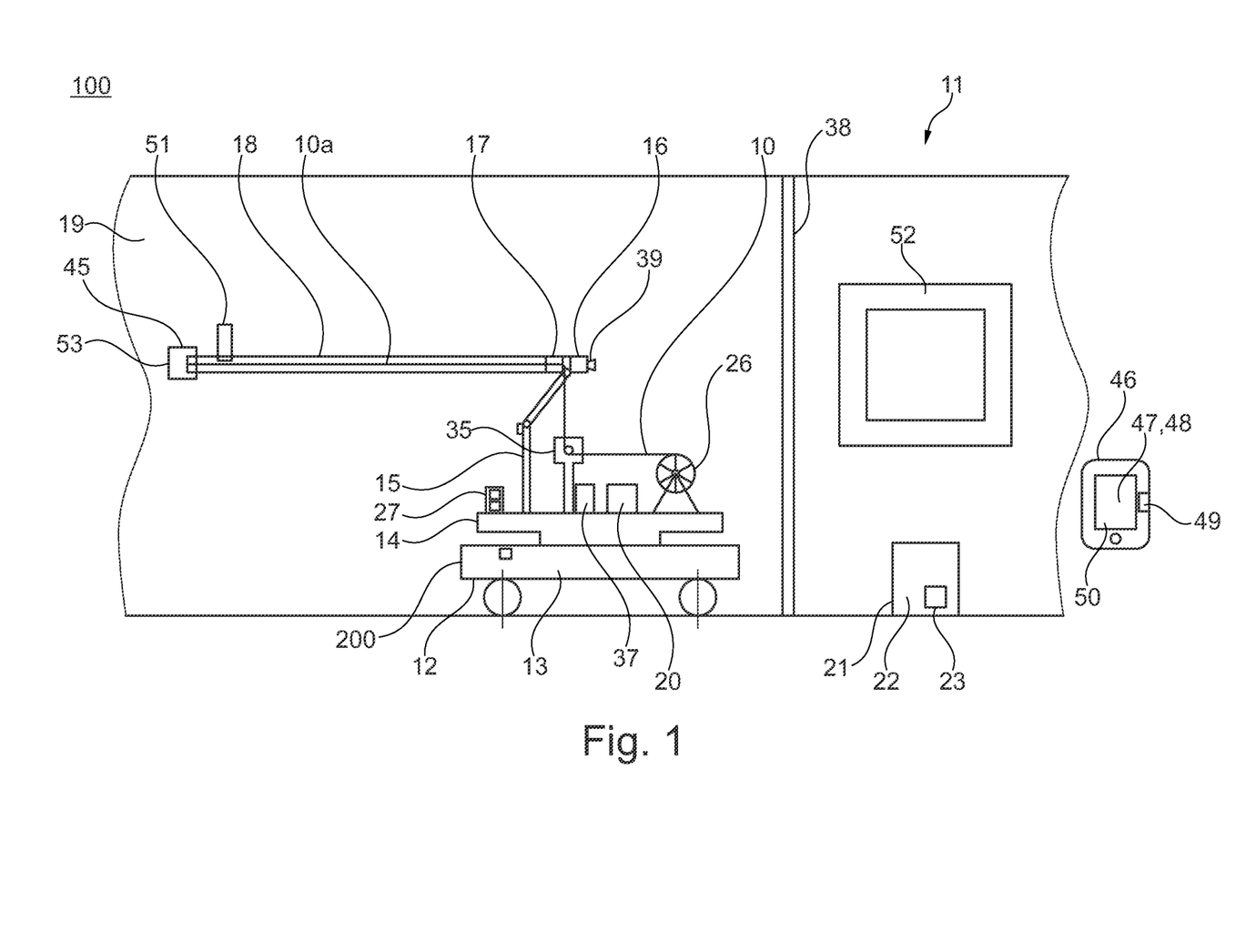
FIG. 1 a cable laying system with a cable laying device,
FIG. 2 a first embodiment of a cable laying device,
FIG. 3 a cable for a cable system,
FIG. 4 a second embodiment of a cable laying device, and
FIG. 5 a third embodiment of a cable laying device.

FIG. 1 shows a schematic representation of a cable laying system 100 for automated laying of cables 10 in a building 11. The cable laying system 100 comprises a cable laying device 200, which is configured as a cable installation robot 12. The cable laying device 200 comprises a mobile base 13 and a base plate 14 rotatably arranged on the base 13. Furthermore, a telescopic arm 15 is arranged on the base plate 14, on which a milling unit 16 and a laying unit 17 are arranged at the end. The milling unit 16 is configured to mill a cable duct 18 into a wall 19 of the building 11. The laying unit 17 is configured to insert a cable 10 into the cable duct 18 manufactured by the milling unit 16. The cable laying device 200 is further provided with a position determination unit 20 for determining the position of laid cable sections 10a. The cable laying system 100 further comprises a central data processing device 22 configured as a server 21 with a storage device 23. The positions of the laid cable sections 10a determined by the position determination unit 20 are stored in the storage device 23.

Figure 2:
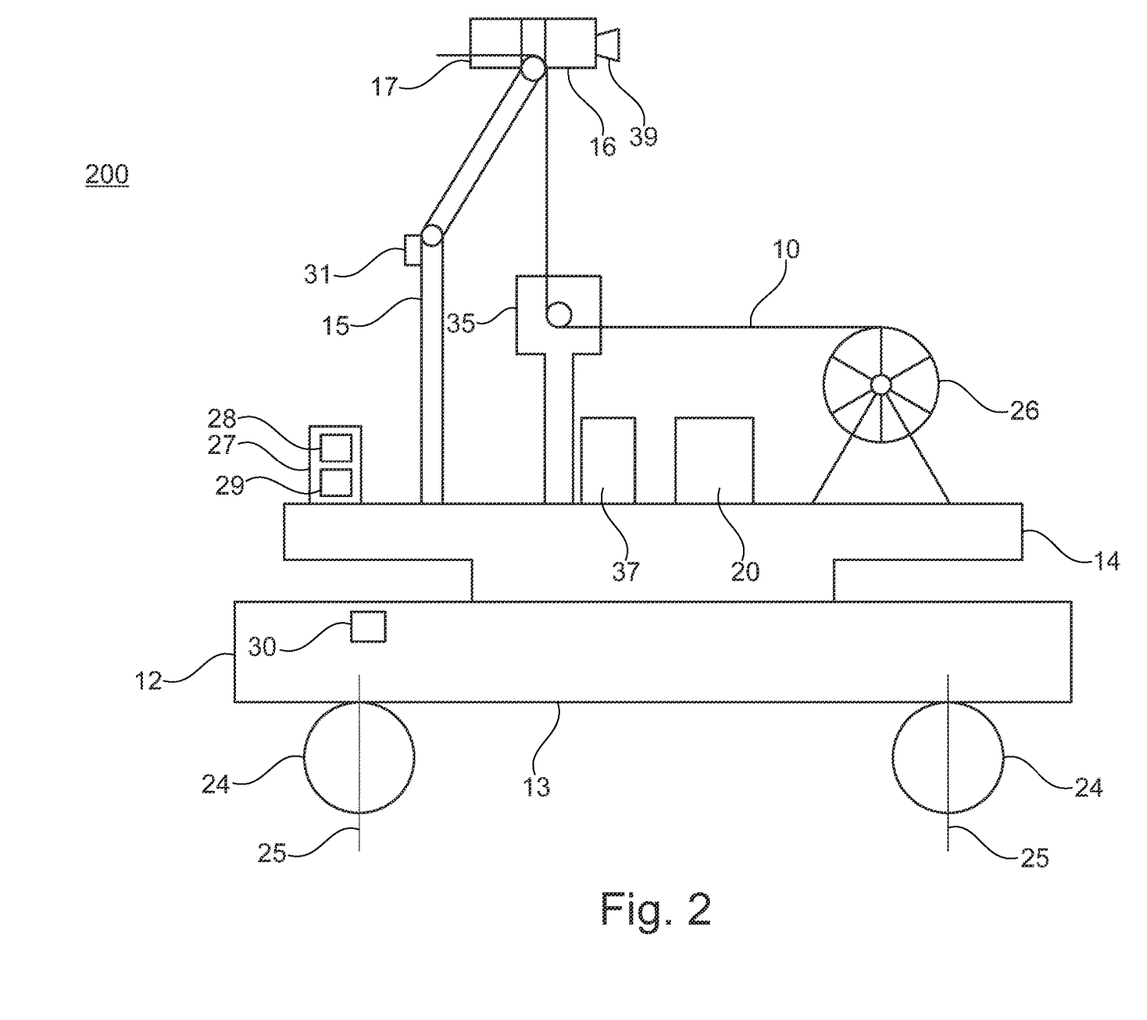

FIG. 2 shows a cable laying device 200 for the cable laying system 100 according to FIG. 1. The cable laying device 200, which is configured as a cable installation robot 12, comprises a mobile base 13 with four wheels 24, which are arranged to rotate through 3600 about a vertical axis 25. A base plate 14 is rotatably arranged on the base 13. On the rotatable base plate 14 is in turn arranged a telescopic arm 15, on the end of which the milling unit 16 for manufacturing a cable duct 18 in the wall of the building 11 and the laying unit 17 for laying a cable 10 into a cable duct 18 manufactured by the milling unit 16 are arranged. The cable 10 to be laid is stocked on a cable drum 26 arranged on the cable laying device 200, and is guided from the cable drum 26 to the laying unit 17. For determining the position of the laid cable sections 10a, the position determination unit 20 is provided with a sensor arrangement 27, wherein the sensor arrangement 27 comprises a LIDAR scanner 28 and a GPS receiver 29. Furthermore, position sensors 30 for determining the orientation of the cable laying device 200 and positioning sensors 31 for detecting the positioning of the telescopic arm 15 are provided. Using the data from the sensor arrangement 27, the position sensors 30, and the positioning sensors 31, the position determination unit 20 can precisely determine the position of the laid cable sections 10a, that is, the orientation, length, height, etc. of the cable sections in the wall 19 of the building 11, and store them in the storage device 23.

Figure 3:
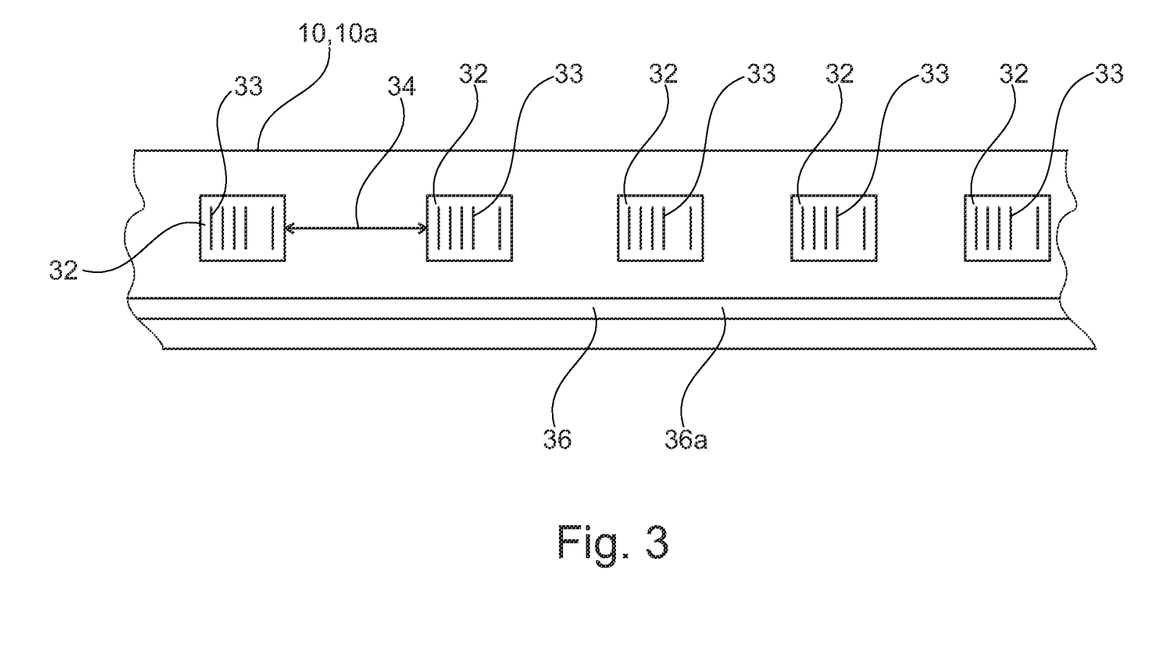

As shown in FIG. 3, the cable 10 to be laid has a marking 32 in the form of a machine-readable code 33, which is applied to the cable 10 at regular intervals 34 of 5 cm, for example. The marking 32 may already have been applied in advance by the manufacturer of the cable 10. However, in the illustrated embodiment according to FIGS. 1 and 2, the cable laying device 200 has a marking device 35 which is configured to continuously provide the cable 10 unrolled from the cable drum 26 and to be laid by the laying unit 17 with the marking 32, for example by the marking device 35 printing the marking 32 on the cable 10. By means of the marking 32, each cable section 10a with a length of 5 cm, or shorter lengths depending on the application requirements, is individually marked. The cable 10 further has an embedded light conductor 36 made of a transparent material 36a, which allows light to be coupled in at one end of the cable 10 and the light to be read out at the other end. This measure enables subsequent identification and assignment of the various cable ends in an electrical installation.

Returning to the cable laying device 200 according to FIG. 2, for the reliable determination of the position of the laid cable sections, this device is also configured to first carry out a measurement of the room in which the cable 10 is to be laid by means of the sensor arrangement 27. This provides a precise floor plan or a precise 3D model of the room. In the process, a computing device 37 of the cable laying device 200 also uses the sensor data to detect obstacles that must be taken into account or circumnavigated when laying the cable 10. Such obstacles can be door lintels, window frames 52 or already laid lines 38 for water or gas. For the laying of the cable 10, the computing device 37 of the cable laying device 200 is configured to calculate a laying plan for the cable 10 in which these obstacles are taken into account accordingly. Based on the laying plan, the cable laying device 200 then lays the cable 10. Furthermore, the cable laying device 200 according to FIG. 2 has a sensor 39 for determining the material condition of the wall 19. For example, a moisture sensor or a hardness sensor may be provided. This enables the cable laying device 200 to set the operating parameters of the milling unit 16 and the laying unit 17 in such a way that the cleanest and fastest possible laying of the cable 10 is ensured.

The computing device 37 of the cable laying device 200 may receive a construction plan and further specifications for the laying of the cable 10 from the central data processing device 22 of the cable laying system 100. The further specifications may consist, for example, of the number and position of modules 53 to be provided, such as sockets, light switches or electronic devices for the SmartHome. Based on the construction plan, the floor plan of the room acquired using the sensor arrangement 27, as well as the further specifications, the computing device 37 of the cable laying device 200 calculates an laying plan for the cable 10 using an artificial intelligence process, in which all specifications are taken into account. After the cable laying device 200 has generated the laying plan, it takes up the work and begins to manufacture the cable duct 18 by means of the milling device 16 and then to lay the cable 10 to be laid into the cable duct 18 by means of the laying device 17. In the process, the cable laying device 200 continuously detects, by means of the position determination unit 20, the position of the laid cable sections 10a as well as the respective marking 32 arranged on the cable 10. The marking 32 and the positions of the cable sections 10a are stored in the storage device 23 and can be read out again later in order to be able to reliably identify and locate the laid cables 10 during renovation work. For this purpose, it may further be provided that for each laid cable 10 additional further information is stored in the storage device 23, such as, for example, the length, the orientation of the laid cable sections 10a or the marking 32 of further cable sections 10a connected to the respective cable section 10a, or the IP addresses of modules 53 such as SmartHome devices, junction boxes, sockets, switches, sensors, etc., connected or to be connected to the laid cable sections 10a.

Figure 4:
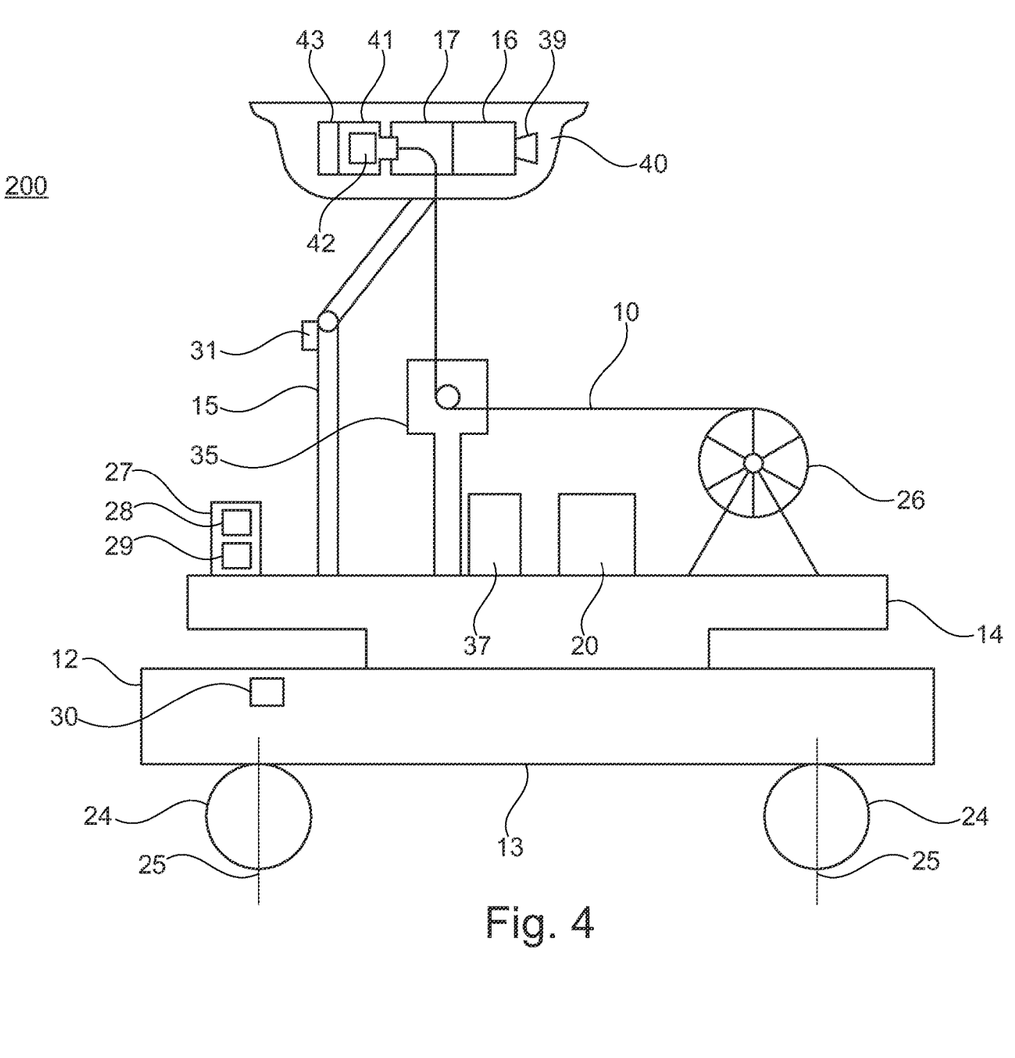

FIG. 4 shows a further cable laying device 200. The cable laying device of FIG. 4 additionally comprises a dust extraction device 40 at the end of the telescopic arm 15 and surrounding the milling unit 16 and the laying unit 17, which extracts the construction dust generated by the milling unit 16 during the manufacturing of the cable ducts 18. In addition, the cable laying unit 200 also has a filler unit 41 with a reservoir 42 for filler and a drying stage 43. After the laying unit 17 has inserted the cable 10 into the cable duct 18 generated by the milling unit 16, the open cable duct 18 is closed by the filler unit 41 with the filler compound, and the drying stage 43 subsequently guided over the filled cable duct serves to dry the filler material.

Figure 5:
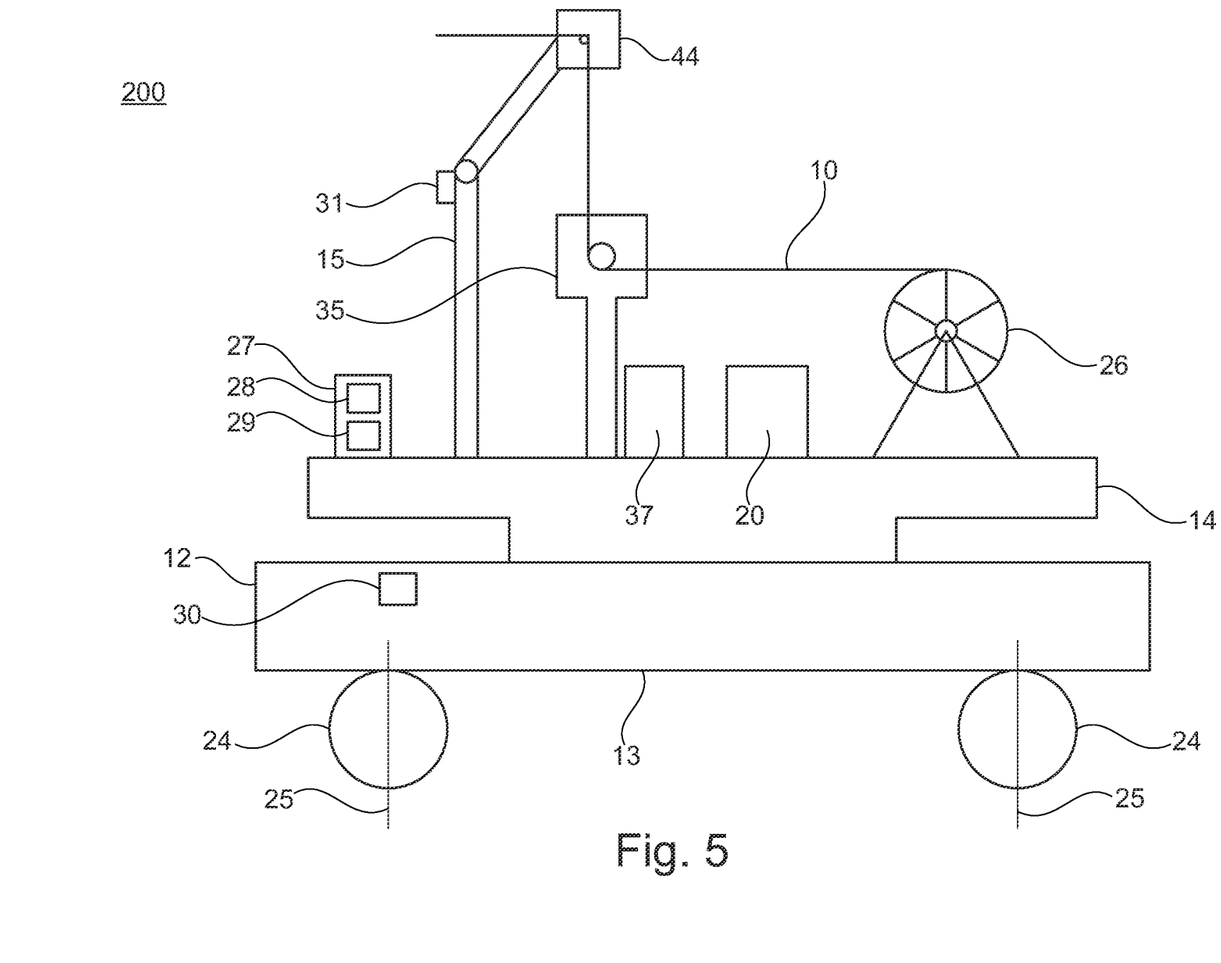

FIG. 5 shows a further cable laying device 200. The cable laying device 200 shown in FIG. 5 is configured for surface laying of a cable 10 and accordingly has means 44 for gluing or tacking the cables.

Referring again to FIG. 1, the central data processing device 22 is permanently assigned to the room or building 11. The central data processing device 22 is configured as a server 21 for intelligent SmartHome devices 45. Based on the markings 32 of the cable sections 10a stored in the storage device 23 together with the positions, as well as the IP addresses of SmartHome devices 45 connected to the laid cable sections 10a, the affected cables 10 can be located after the laying of the cables 10 in the event of faults occurring in a SmartHome device 45. To indicate the location of the affected cable 10, the system 100 further comprises a software application 46 which is carried out on a portable data processing device 47, such as a smartphone 48. The software application 46 retrieves the data regarding the position and function of the laid cables 10 from the storage device 23 of the central data processing device 22, and further uses the sensors 49 of the data processing device 47, such as position sensors and a camera, to display the laid cables 10 on a screen 50 in an augmented reality process. The display or screen 50 of the portable data processing device 47 then displays the laid cables 10 along with corresponding information quasi in a floating manner in front of the wall 19.

The central data processing device 22 may further be configured to turn an LED light source 51 on and off, which may be used to couple light into the light conductor 36 of the cable 10. This allows cable ends to be assigned to each other.

The invention claimed is:

1. A cable laying system for automated laying of cables in a building, comprising a cable installation robot, with a mobile base and a laying unit arranged on the base, configured for laying a cable, wherein the cable installation robot comprises a position determination unit for determining the position of laid cable sections, wherein the cable laying system is configured to store the position of laid cable sections in a storage device.

2. The cable laying system according to claim 1, wherein the cable laying system is configured to generate an installation plan of the laid cable sections.

3. The cable laying system according to claim 1, wherein a cable to be laid is provided, wherein the cable to be laid has a marking, preferably a machine-readable code, at regular intervals, or wherein the cable installation robot has a marking device, wherein the marking device is configured, preferably when laying the cable, to provide the cable with a marking, preferably with a machine-readable code, at regular intervals, wherein particularly preferably each cable section has a marking, or wherein the marking device is configured to provide each cable section with a marking.

4. The cable laying system according to claim 3, wherein the marking is an infinite or continuous marking, wherein the marking changes at intervals along the cable of less than 5 cm, preferably of less than 3 cm, more preferably of less than 1 cm, so that each cable section with a length of less than 5 cm, preferably of less than 3 cm, more preferably of less than 1 cm, is individually marked.

5. The cable laying system according to claim 3, wherein the cable laying system is configured to store the position of laid cable sections together with the marking arranged on the cable section in the storage device.

6. The cable laying system according to claim 1, wherein the cable laying system is configured to store the position of laid cable sections together with a length or a position or an orientation of the laid cable sections, or with markings of further cable sections connected to the respective cable section, or with IP addresses of modules connected or to be connected to the laid cable sections, or a date, in the storage device.

7. The cable laying system according to claim 1, wherein cable installation robot comprises a milling unit, wherein the milling unit is designed to manufacture a cable duct in a wall or masonry of the building, wherein the laying unit is configured to lay a cable section to be laid in a cable duct manufactured by the milling unit, wherein preferably the milling unit comprises a pot drill or a slot drill or a cutting disc.

8. The cable laying system according to claim 1, wherein the cable installation robot has a telescopic arm, wherein the laying unit or the milling unit is or are attached to the telescopic arm, or wherein the cable laying device has a dust extraction device, or wherein the cable laying device comprises a filler unit or a drying stage for drying a filler material.

9. The cable laying system according to claim 1, wherein the cable installation robot comprises a sensor arrangement, wherein the sensor arrangement is configured to generate a floor plan or a 3D model of a room of the building, wherein preferably the sensor arrangement comprises a laser scanner or a LIDAR scanner, or a direction finder transmitter or a direction finder receiver or a GPS receiver or a compass.

10. The cable laying system according to claim 1, wherein the position determination unit comprises position sensors or positioning sensors, in particular for the telescopic arm, or the sensor arrangement, or wherein the cable installation robot has a sensor for determining a material condition of walls or of a masonry of the building.

11. The cable laying system according to claim 1, wherein the cable laying system comprises a computing device, wherein the computing device is configured to generate a laying plan, preferably depending on specifications, wherein the laying plan comprises the position or location of the cables or cable sections to be laid, or of electrical devices or junction boxes or sockets or switches or sensors.

12. The cable laying system according to claim 1, wherein the cable installation robot has means for surface laying of cables or cable sections to be laid, or wherein the mobile base of cable installation robot has wheels, wherein the wheels are pivotable about a vertical axis, preferably by 180°, more preferably by 360°.

13. The cable laying system according to claim 1, wherein a central data processing device is provided, wherein the central data processing device is configured to apply a high-frequency alternating voltage to the shielding or a core of a laid cable, or wherein the central data processing device is configured to couple light into a transparent material of an insulation of the cable.

14. The cable laying system according to claim 1, wherein a software application for a portable data processing device is provided, wherein by means of the software application executed on the portable data processing device the positions of laid cable sections can be displayed, preferably with an augmented reality process.

15. A cable for a cable laying system according to claim 1, wherein the cable has a marking, preferably a machine-readable code, at regular intervals, wherein the marking is preferably an infinite or continuous marking, wherein the marking changes at intervals along the cable of less than 5 cm, preferably of less than 3 cm, particularly preferably of less than 1 cm, so that each cable section with a length of less than 5 cm, preferably of less than 3 cm, particularly preferably of less than 1 cm, is individually marked.

* * * * *